United States Patent
Ono et al.

(10) Patent No.: US 9,321,208 B2
(45) Date of Patent: Apr. 26, 2016

(54) NANOFIBERS WITH EXCELLENT BIODEGRADABILITY AND BIOCOMPATIBILITY AND METHOD FOR PRODUCING THE SAME

(75) Inventors: Tsutomu Ono, Okayama (JP); Yukitaka Kimura, Okayama (JP)

(73) Assignee: TMT Machinery, Inc., Osaka (JP)

( * ) Notice: Subject to any disclaimer, the term of this patent is extended or adjusted under 35 U.S.C. 154(b) by 545 days.

(21) Appl. No.: 13/819,521

(22) PCT Filed: Aug. 29, 2011

(86) PCT No.: PCT/JP2011/069439
§ 371 (c)(1),
(2), (4) Date: Feb. 27, 2013

(87) PCT Pub. No.: WO2012/029710
PCT Pub. Date: Mar. 8, 2012

(65) Prior Publication Data
US 2013/0157367 A1    Jun. 20, 2013

(30) Foreign Application Priority Data

Aug. 30, 2010   (JP) ................................ 2010-192223

(51) Int. Cl.
| | | |
|---|---|---|
| A61K 9/00 | (2006.01) |
| B29C 47/00 | (2006.01) |
| D01D 5/06 | (2006.01) |
| D01F 6/84 | (2006.01) |
| D01F 6/86 | (2006.01) |

(52) U.S. Cl.
CPC .............. *B29C 47/0071* (2013.01); *D01D 5/06* (2013.01); *D01F 6/84* (2013.01); *D01F 6/86* (2013.01); *Y10T 428/298* (2015.01)

(58) Field of Classification Search
None
See application file for complete search history.

(56) References Cited

U.S. PATENT DOCUMENTS 5,593,778 A    1/1997 Kondo et al.

FOREIGN PATENT DOCUMENTS

| | | |
|---|---|---|
| CN | 100406632 C | 7/2008 |
| EP | 2 418 232 A1 | 2/2012 |
| JP | 1-108226 A | 4/1989 |
| JP | 7-165896 A | 6/1995 |
| JP | 2003-328229 A | 11/2003 |
| JP | 2007-186831 A | 7/2007 |
| JP | 2007291567 A * | 11/2007 |
| JP | 2007-325543 A | 12/2007 |
| WO | WO 96/21056 A1 | 7/1996 |
| WO | WO 2010/101240 A1 | 9/2010 |

OTHER PUBLICATIONS

Machine translation of JP 2007291567 A, Sep. 2015.*
Extended European Search Report issued Jan. 3, 2014 in Patent Application No. 11821726.4.
Kevin D. Nelson, et al. "Technique paper for wet-spinning poly(L-lactic acid) and poly(DL-lactide-co-glycolide) monofilament fibers", Tissue Engineering, vol. 9, XP-002717849, Dec. 2003, p. 1323 (submitting Derwent abstract only).
Chang Mo Hwang, et al. "Microfluidic chip-based fabrication of PLGA microfiber scaffolds for tissue engineering", Langmuir, vol. 24, No. 13, XP-002717861, May 30, 2008, pp. 6845-6851.
C.M. Hwang, et al. "Controlled cellular orientation on PLGA microfibers with defined diameters", Biomed Microdevices, vol. 11, No. 4, XP-002717862, Feb. 26, 2009, pp. 739-746.
Feng-Lei Zhou, et al. "Review manufacturing technologies of polymeric nanofibres and nanofibre yarns", Polymer International, vol. 57, No. 6, XP-002717877, Oct. 26, 2007, pp. 837-845.
International Search Report issued Nov. 8, 2011 in PCT/JP2011/069439.
Moe Kitanaka, et al. "Preparation of poly(lactide) nanofiber with solvent diffusion method", Polymer Preprints, vol. 59, No. 2, Sep. 1, 2010, pp. 5278-5279 with English abstract.
Kevin D. Nelson, Ph.D., et al., "Technique Paper for Wet-Spinning Poly(L-lactic acid) and Poly DL-lactide-co-glycolide) Monofilament Fibers", Tissue Engineering, vol. 9, No. 6, 2003, pp. 1323-1330.
M.J.D. Eenink, et al., "Biodegradable Hollow Fibres for the Controlled Release of Hormones", Journal of Controlled Release, vol. 6, 1987, pp. 225-247.

* cited by examiner

*Primary Examiner* — Paul Dickinson
(74) *Attorney, Agent, or Firm* — Oblon, McClelland, Maier & Neustadt, L.L.P.

(57) ABSTRACT

The invention provides a method for producing nanofibers of an aliphatic polyester resin (a biodegradable resin) with higher productivity than heretofore achieved, for example, without the need of cumbersome steps such as drawing and with operability at normal temperature. The method for producing nanofibers according to the invention includes (1) an extrusion step of extruding an organic solvent solution (S) into filaments in an aqueous solution (W) including a surfactant (SF) and water, the organic solvent solution (S) including an aliphatic polyester resin (A0) or an oil-soluble low block copolymer (A) including a block derived from an aliphatic polyester resin (A1) and a block derived from a hydrophilic polymer (A2), and an organic solvent (S1); and (2) a spinning step of collecting the filaments of the organic solvent solution (S) extruded in the step (1) while simultaneously diffusing or extracting the organic solvent (S1) of the organic solvent solution (S) into the aqueous solution (W), thereby forming fibers including the aliphatic polyester resin (A0) or the oil-soluble low block copolymer (A).

22 Claims, 4 Drawing Sheets

NANOFIBERS WITH EXCELLENT BIODEGRADABILITY AND BIOCOMPATIBILITY AND METHOD FOR PRODUCING THE SAME

CROSS-REFERENCE TO RELATED APPLICATIONS

This application is a National Stage of PCT/JP2011/069439 filed Aug. 29, 2011. This application is based upon and claims the benefit of priority to Japanese Patent Application No. 2010-192223 filed Aug. 30, 2010.

TECHNICAL FIELD

The present invention relates to "nanofibers" with a nanometer-level fiber width formed from an aliphatic polyester resin (a biodegradable resin), and to a method for producing such nanofibers.

BACKGROUND ART

An "electrospinning (ES) method" has been widely used for the production of nanofibers. Technologies of nanofiber production by an ES method started to be developed in around 1998 mainly at the NTC (national textile center) in the United States. The United States have launched a drastically increasing number of projects since 2002, and allocated a budget of more than 25 billions of yen for researches (in 2003). More than 29 public and private research institutes nationwide have been working on the development of nanofiber technology in the United States. The method utilizes a phenomenon in which a charged liquid is sprayed against the surface tension in a space that is energized with a high voltage. This method can produce products such as nonwoven fabrics and paper articles easily. In Japan, manufacturers such as TORAY INDUSTRIES, INC. produce nanofibers by the "melt nano dispersion spinning technology".

The "technological strategy map 2009", the Ministry of Economy, Trade and Industry, aims to develop a wet spinning method for the production of polylactic acid fibers by 2011. A wet spinning method is a widely used process for producing polymeric fibers. However, reports of its application to the manufacturing of polylactic acid have been limited (Patent Literature 1, Non Patent Literatures 1 and 2). In particular, the production of nanofibers by a wet spinning method is unprecedented.

CITATION LIST

Patent Literature

Patent Literature 1: JP-A-2003-328229 (Japanese patent No. 3749502)

Non Patent Literature

Non Patent Literature 1: K. D. Nelson et al., Tissue Eng., 9, 1323 (2003)
Non Patent Literature 2: M. J. D. Eenink et al., J. Controlled Release, 6, 225 (1987)

SUMMARY OF INVENTION

Technical Problem

The "ES method" can produce nanofibers of various polymers. However, the practice of this method is dangerous because of the application of a high voltage. Further, the products are most often in the form of nonwoven fabrics. The "melt nano dispersion spinning method" entails the need of preliminarily melting a polymer solution as well as drawing of fibers in order to produce nanofibers.

An object of the present invention is to provide a method for producing nanofibers of an aliphatic polyester resin (a biodegradable resin) with higher productivity than heretofore achieved, for example, without the need of cumbersome steps such as drawing and with operability at normal temperature.

Solution to Problem

The present inventors have developed a "solvent diffusion method" which can produce nanofibers at normal temperature without entailing drawing. According to this method, an organic solvent solution (an oil phase) of an oil-soluble resin as a material for nanofibers, typically an oil-soluble diblock copolymer which includes a block derived from an aliphatic polyester resin (a hydrophobic segment) and a block derived from a hydrophilic polymer (a hydrophilic segment) is extruded into filaments in an aqueous solution (an aqueous phase) of a surfactant, typically a water-soluble diblock copolymer having a similar structure to the oil-soluble diblock copolymer, and the organic solvent in the oil phase is diffused into the aqueous phase, thus forming nanofibers of the oil-soluble diblock copolymer. The present invention has been completed based on this method.

An aspect of the invention provides nanofibers that include an oil-soluble low block copolymer (A) including a block derived from an aliphatic polyester resin (A1) and a block derived from a hydrophilic polymer (A2), the average cross sectional diameter of the fibers being less than 1 μm.

The average cross sectional diameter of the nanofibers is preferably in the range of 100 to 500 nm.

For example, the oil-soluble low block copolymer (A) may be an oil-soluble di- or triblock copolymer (A) which includes one or two kinds of blocks derived from an aliphatic polyester resin(s) (A1), and one or two kinds of blocks derived from a hydrophilic polymer(s) (A2). For example, the block(s) derived from an aliphatic polyester resin(s) (A1) may include a block derived from an aliphatic polyester resin in which a hydroxycarboxylic acid or a dicarboxylic acid that is a component of the resin has 2 to 6 carbon atoms.

The oil-soluble low block copolymer (A) preferably has a number average molecular weight Mn in the range of 500 to 200,000, a weight average molecular weight Mw in the range of 500 to 200,000, and a molecular weight distribution Mw/Mn in the range of 1.00 to 3.00 according to GPC.

The aliphatic polyester resin (A1) preferably has a number average molecular weight Mn in the range of 100 to 200,000, a weight average molecular weight Mw in the range of 100 to 200,000, and a molecular weight distribution Mw/Mn in the range of 1.00 to 2.00 according to GPC.

The hydrophilic polymer (A2) preferably has a number average molecular weight distribution Mn in the range of 100 to 200,000, a weight average molecular weight Mw in the range of 100 to 200,000, and a molecular weight distribution Mw/Mn in the range of 1.00 to 2.00 according to GPC.

The aliphatic polyester resin (A1) is preferably at least one aliphatic polyester resin selected from the group consisting of polylactic acid, polyglycolic acid, polycaproic acid and polybutylene succinate.

The hydrophilic polymer (A2) is preferably at least one hydrophilic polymer selected from the group consisting of polyoxyethylene, polyoxypropylene, polyvinyl alcohol, partially hydrolyzed polyvinyl acetate copolymer, polymethacrylic acid, polyacrylic acid, polyacrylamide, polyaspartic acid, polysaccharides, polyisopropylacrylamide, poly (sodium styrenesulfonate) and derivatives of these polymers.

The constitutional ratio in the oil-soluble low block copolymer (A) is preferably such that the polymerization degree of the block derived from a hydrophilic polymer (A2) is in the range of 0.1 to 100 parts based on 100 parts of the polymerization degree of the block derived from an aliphatic polyester resin (A1).

The oil-soluble low block copolymer (A) preferably has an HLB value of not less than 0.4 and not more than 10.

The present invention also provides a scaffold for cell culture and growth which includes the above nanofibers.

Another aspect of the invention provides a method for producing nanofibers including:

(1) an extrusion step of extruding an organic solvent solution (S) into filaments in an aqueous solution (W) including a surfactant (SF) and water, the organic solvent solution (S) including an aliphatic polyester resin (A0) or an oil-soluble low block copolymer (A) including a block derived from an aliphatic polyester resin (A1) and a block derived from a hydrophilic polymer (A2), and an organic solvent (S1); and (2) a spinning step of collecting the filaments of the organic solvent solution (S) extruded in the step (1) while simultaneously diffusing or extracting the organic solvent (S1) of the organic solvent solution (S) into the aqueous solution (W), thereby forming fibers including the aliphatic polyester resin (A0) or the oil-soluble low block copolymer (A).

In the extrusion step (1), the organic solvent solution (S) and the aqueous solution (W) are preferably supplied through a double-tube micronozzle channel.

For example, the oil-soluble low block copolymer (A) may be an oil-soluble di- or triblock copolymer (A) which includes one or two kinds of blocks derived from an aliphatic polyester resin(s) (A1), and one or two kinds of blocks derived from a hydrophilic polymer(s) (A2). For example, the block(s) derived from an aliphatic polyester resin(s) (A1) may include a block derived from an aliphatic polyester resin in which a hydroxycarboxylic acid or a dicarboxylic acid that is a component of the resin has 2 to 6 carbon atoms.

The oil-soluble low block copolymer (A) preferably has a number average molecular weight Mn in the range of 500 to 200,000, a weight average molecular weight Mw in the range of 500 to 200,000, and a molecular weight distribution Mw/Mn in the range of 1.00 to 3.00 according to GPC.

The aliphatic polyester resin (A0) or the aliphatic polyester resin (A1) preferably has a number average molecular weight Mn in the range of 100 to 200,000, a weight average molecular weight Mw in the range of 100 to 200,000, and a molecular weight distribution Mw/Mn in the range of 1.00 to 2.00 according to GPC.

The hydrophilic polymer (A2) preferably has a number average molecular weight Mn in the range of 100 to 200,000, a weight average molecular weight Mw in the range of 100 to 200,000, and a molecular weight distribution Mw/Mn in the range of 1.00 to 2.00 according to GPC.

The aliphatic polyester resin (A0) or the aliphatic polyester resin (A1) is preferably at least one aliphatic polyester resin selected from the group consisting of polylactic acid, polyglycolic acid, polycaproic acid and polybutylene succinate.

The hydrophilic polymer (A2) is preferably at least one hydrophilic polymer selected from the group consisting of polyoxyethylene, polyoxypropylene, polyvinyl alcohol, partially hydrolyzed polyvinyl acetate copolymer, polymethacrylic acid, polyacrylic acid, polyacrylamide, polyaspartic acid, polysaccharides, polyisopropylacrylamide, poly (sodium styrenesulfonate) and derivatives of these polymers.

The constitutional ratio in the oil-soluble low block copolymer (A) is preferably such that the polymerization degree of the block derived from a hydrophilic polymer (A2) is in the range of 0.1 to 100 parts based on 100 parts of the polymerization degree of the block derived from an aliphatic polyester resin (A1).

The oil-soluble low block copolymer (A) preferably has an HLB value of not less than 0.4 and not more than 10.

The surfactant (SF) is preferably a nonionic surfactant and is particularly preferably a water-soluble low block copolymer (B) which includes a block derived from an aliphatic polyester resin (B1) and a block derived from a hydrophilic polymer (B2).

For example, the water-soluble low block copolymer (B) may be a water-soluble di- or triblock copolymer (B) which includes one or two kinds of blocks derived from an aliphatic polyester resin(s) (B1), and one or two kinds of blocks derived from a hydrophilic polymer(s) (B2). For example, the block(s) derived from an aliphatic polyester resin(s) (B1) may include a block derived from an aliphatic polyester resin in which a hydroxycarboxylic acid or a dicarboxylic acid that is a component of the resin has 2 to 6 carbon atoms.

The water-soluble low block copolymer (B) preferably has a number average molecular weight Mn in the range of 500 to 200,000, a weight average molecular weight Mw in the range of 500 to 200,000, and a molecular weight distribution Mw/Mn in the range of 1.00 to 2.00 according to GPC.

The aliphatic polyester resin (B1) preferably has a number average molecular weight Mn in the range of 100 to 200,000, a weight average molecular weight Mw in the range of 100 to 200,000, and a molecular weight distribution Mw/Mn in the range of 1.00 to 2.00 according to GPC.

The hydrophilic polymer (B2) preferably has a number average molecular weight Mn in the range of 100 to 200,000, a weight average molecular weight Mw in the range of 100 to 200,000, and a molecular weight distribution Mw/Mn in the range of 1.00 to 2.00 according to GPC.

The aliphatic polyester resin (B1) is preferably at least one aliphatic polyester resin selected from the group consisting of polylactic acid, polyglycolic acid, polycaproic acid and polybutylene succinate.

The hydrophilic polymer (B2) is preferably at least one hydrophilic polymer selected from the group consisting of polyoxyethylene, polyoxypropylene, polyvinyl alcohol, partially hydrolyzed polyvinyl acetate copolymer, polymethacrylic acid, polyacrylic acid, polyacrylamide, polyaspartic acid, polysaccharides, polyisopropylacrylamide, poly (sodium styrenesulfonate) and derivatives of these polymers.

The constitutional ratio in the water-soluble low block copolymer (B) is preferably such that the polymerization degree of the block derived from a hydrophilic polymer (B2) is in the range of 100 to 100,000 parts based on 100 parts of the polymerization degree of the block derived from an aliphatic polyester resin (B1).

The water-soluble low block copolymer (B) preferably has an HLB value of not less than 8 and less than 20.

The organic solvent (S1) is preferably at least one organic solvent capable of dissolving the oil-soluble low block copolymer (A) or the aliphatic polyester resin (A0) selected from the group consisting of esters, ethers, ketones, aromatic compounds, alcohols, halogenated hydrocarbons and carbonates.

The ratio ($\eta_r = \eta_s/\eta_w$) may be preferably 50 to 50,000 wherein $\eta_s$ is the viscosity of the organic solvent solution (S) and $\eta_w$ is the viscosity of the aqueous solution (W) that is an outer phase.

The method for producing nanofibers may further include a winding step (3) of winding the fibers formed in the step (2) without or while drawing the fibers.

Advantageous Effects of Invention

The method for producing nanofibers according to the present invention is novel and substantially distinguished from the conventional ES method in that the inventive method can be performed at normal temperature without entailing a high voltage electric field or drawing operation. According to the method of the invention, nanofibers can be produced efficiently in the form of spun filaments (unlike the form of nonwoven fabrics). Further, the cross sectional diameter of the nanofibers can be controlled by controlling the flow rates of the inner and outer phases. Thus, nanofibers having a desired fiber width may be produced easily. The nanofiber production method of the invention may be applied not only to the production of nanofibers from a polylactic acid resin having a block derived from a hydrophilic polymer such as a PEG chain (in which case the surface of the obtainable fibers is modified with the hydrophilic polymer), but also to the production of nanofibers formed of other types of resins which can be dissolved in the inner-phase organic solvent.

DESCRIPTION OF EMBODIMENTS

—Oil-Soluble Low Block Copolymer (A)—

Figure 1:
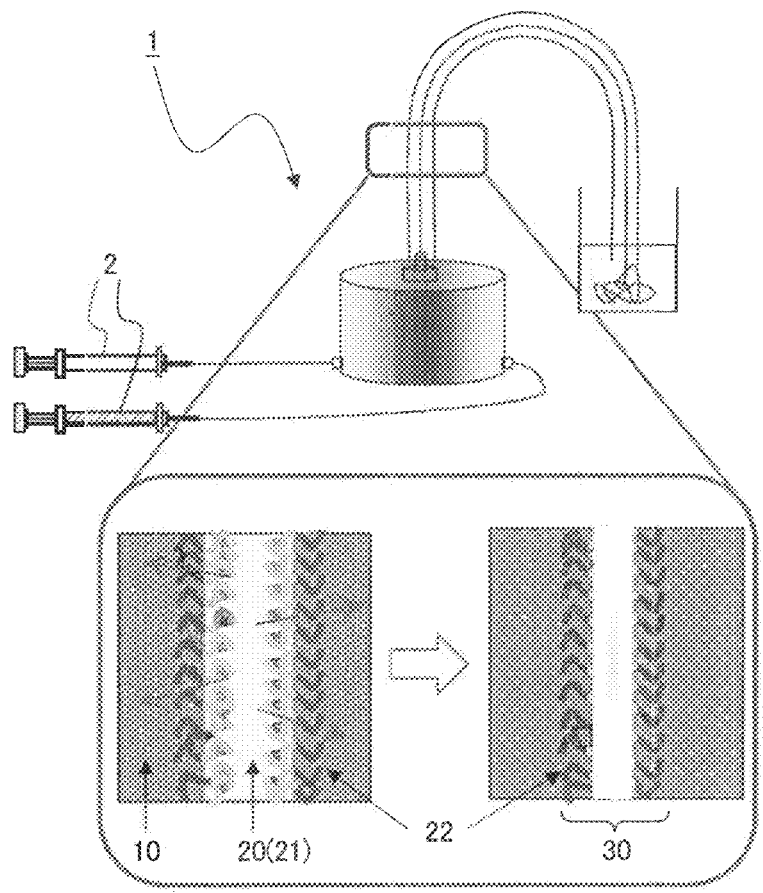
FIG. 1 Figure [a] is a schematic view of a double-tube micronozzle apparatus 1 equipped with syringes 2 that is used in the invention (examples). In the frame: an organic solvent (S1) 21 of an organic solvent solution (S) 20 extruded from an inner tube 120 is removed by being diffused into an aqueous solution (W) 10 with the result that molecules of a precipitated oil-soluble low block copolymer (A) 22 are aggregated to form nanofibers 30. Figure [b] is an enlarged plan view of an opening of a double-tube micronozzle 100 of the apparatus.
Figure 1:
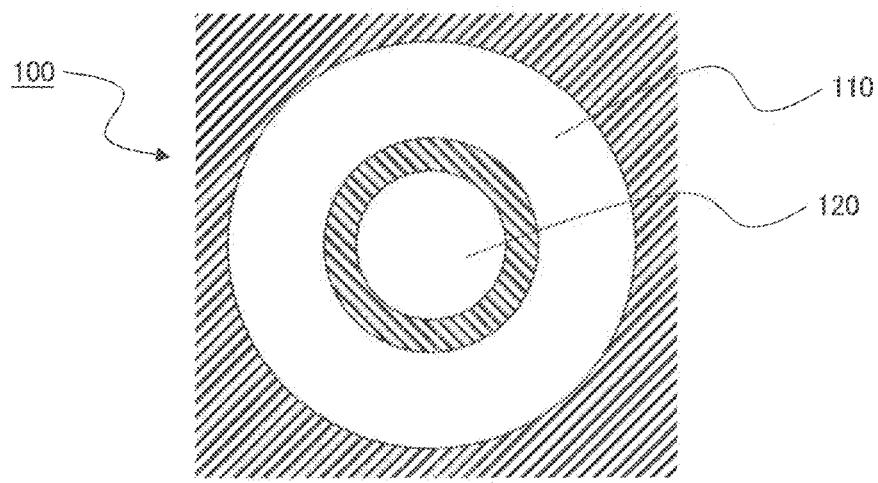

In the invention, an oil-soluble low block copolymer (A) is used as a material for nanofiber production. This copolymer includes a block (structural units) derived from an aliphatic polyester resin (A1) and a block derived from a hydrophilic polymer (A2). The block derived from an aliphatic polyester resin (A1) forms a hydrophobic segment, and the block derived from a hydrophilic polymer (A2) literally forms a hydrophilic segment. The oil-soluble low block copolymer (A) in which these blocks are linked together exhibits oil solubility as a whole and is soluble in an organic solvent (S1). The oil-soluble low block copolymer (A) forms the nanofibers of the invention. In the fiber production method, the copolymer is dissolved in an organic solvent solution (S).

In the invention, the term "low block copolymers" (both for oil-soluble low block copolymers (A) and water-soluble low block copolymers (B)) refers to copolymers including several kinds of blocks, for example, di- or triblock copolymers, formed of one, or two or more kinds of blocks derived from an aliphatic polyester resin(s), and one, or two or more kinds of blocks derived from a hydrophilic polymer(s). Diblock copolymers represented by the following formula are typical low block copolymers in the invention. In such low block copolymers, the blocks derived from an aliphatic polyester resin and the blocks derived from a hydrophilic polymer may be arranged in any configurations provided that the copolymer can be used in the nanofiber production method of the invention, which will be described later, without adversely affecting properties such as spinnability. However, the configuration is generally such that one side of the low block copolymer is occupied by the block derived from an aliphatic polyester resin alone and the other side by the block derived from a hydrophilic polymer alone.

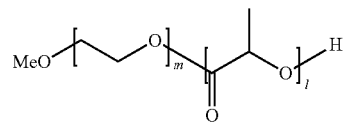

In the invention, the "block derived from an aliphatic polyester resin" and the "block derived from a hydrophilic polymer" are not particularly limited as long as a hydrophobic segment (units) derived from the former resin and a hydrophilic segment (units) derived from the latter resin are present as blocks in the low block copolymer. That is, the invention has an embodiment in which the aliphatic polyester resin and the hydrophilic polymer are each a homopolymer synthesized from a single kind of monomer, and such homopolymers are linked together to form a low block copolymer in a narrow sense of block copolymer. Further, the invention has another embodiment in which at least one of the aliphatic polyester resin and the hydrophilic polymer is a random copolymer synthesized from two or more kinds of monomers or prepolymers (for example, a random copolymer synthesized from polylactic acid and polyglycolic acid as prepolymers), and such (co)polymers are linked together to form a low block copolymer in a broad sense of block copolymer.

The oil-soluble low block copolymer (A) preferably has a number average molecular weight Mn of 500 to 200,000, a weight average molecular weight Mw of 500 to 200,000, and a molecular weight distribution Mw/Mn of 1.00 to 3.00 according to GPC.

The oil-soluble low block copolymer (A) used as a material for nanofiber production may be a single low block copolymer or a mixture of two or more low block copolymers described above.

In the invention, the "oil-soluble" low block copolymer (A) and the "water-soluble" low block copolymer (B) are at least such that these copolymers can be dissolved in the selected oil phase (organic solvent) and aqueous phase, respectively. That is, these terms do not exclude that the "oil-soluble" low block copolymer (A) is dissolved in water to a certain extent and the "water-soluble" low block copolymer (B) is dissolved in the organic solvent to a certain extent.

—Aliphatic Polyester Resin (A1) Block

The aliphatic polyester resin (A1) that forms a portion of the blocks in the oil-soluble low block copolymer (A) may be any of various known aliphatic polyester resins. The oil-soluble low block copolymer (A) may include a single kind of block derived from an aliphatic polyester resin (A1), or two or more kinds of blocks derived from aliphatic polyester resins (A1).

For example, the blocks derived from an aliphatic polyester resin (A1) suitably include or consist solely of a block derived from an aliphatic polyester resin in which a hydroxycarboxylic acid or a dicarboxylic acid that is a component of the resin has 2 to 6 carbon atoms, in particular any of known conventional biodegradable polymers such as polylactic acid, polyglycolic acid, polycaproic acid and polybutylene succinate. These resins may be used singly, or two or more kinds may be used in combination.

The hydroxycarboxylic acids or dicarboxylic acids having 2 to 6 carbon atoms, and diols to be copolymerized therewith are not particularly limited as long as the compounds may be used as materials for the production of aliphatic polyester resins. Examples of the hydroxycarboxylic acids having 2 to 6 carbon atoms include glycolic acid (C2), lactic acid (C3), 3-hydroxybutyric acid (C4), 4-hydroxybutyric acid (C4), 4-hydroxyvaleric acid (C5), 5-hydroxyvaleric acid (C5) and 6-hydroxycaproic acid (C6). When the aliphatic hydroxycarboxylic acid has an asymmetric carbon atom, any of an L-isomer, a D-isomer and a mixture thereof (a racemic mixture) may be used. Examples of the dicarboxylic acids having 2 to 6 carbon atoms include oxalic acid (C2), malonic acid (C3), succinic acid (C4), glutaric acid (C5) and adipic acid (C6). Examples of the diols include ethylene glycol, diethylene glycol, triethylene glycol, propylene glycol, dipropylene glycol, 1,3-butanediol, 1,4-butanediol, 3-methyl-1,5-pentadiol and 1,6-hexanediol. These compounds may be used singly, or two or more kinds may be used in combination.

Examples of the aliphatic polyester resins (A1) include aliphatic hydroxycarboxylic acid homopolymers (for example, polylactic acid, polyglycolic acid) and copolymers (for example, copolymers of lactic acid and glycolic acid); copolymers of aliphatic diols and aliphatic dicarboxylic acids (for example, polybutylene succinate, polyethylene adipate, copolymers of butanediol with succinic acid and adipic acid, copolymers of ethylene glycol and butanediol with succinic acid); and copolymers of aliphatic hydroxycarboxylic acids with aliphatic diols and/or aliphatic dicarboxylic acids (for example, block copolymers of polylactic acid and polybutylene succinate).

The aliphatic polyester resin (A1) preferably has a number average molecular weight Mn of 100 to 200,000 according to GPC. The weight average molecular weight Mw is preferably 100 to 200,000. The molecular weight distribution Mw/Mn is preferably 1.00 to 2.00. In the case where a plurality of kinds of blocks derived from aliphatic polyester resins (A1) are present in the oil-soluble low block copolymer (A), the aliphatic polyester resin (A1) defined above indicates a block copolymer in which such blocks are linked together to form a hydrophobic segment.

—Hydrophilic Polymer (A2) Block

The hydrophilic polymer (A2) that forms a portion of the blocks in the oil-soluble low block copolymer (A) may be any of various hydrophilic polymers that can be bonded to the aliphatic polyester resin (A1) block. The oil-soluble low block copolymer (A) may include a single kind of block derived from a hydrophilic polymer (A2), or two or more kinds of blocks derived from hydrophilic polymers (A2).

Examples of the hydrophilic polymers (A2) include polyoxyethylene (polyethylene glycol: PEG), polyoxypropylene, polyvinyl alcohol, partially hydrolyzed polyvinyl acetate copolymer, polymethacrylic acid, polyacrylic acid, polyacrylamide, polyaspartic acid, polysaccharides, polyisopropylacrylamide, poly(sodium styrenesulfonate) and derivatives of these polymers. These hydrophilic polymers may be used singly, or two or more kinds may be used in combination.

The hydrophilic polymer (A2) preferably has a number average molecular weight Mn of 100 to 200,000 according to GPC. The weight average molecular weight Mw is preferably 100 to 200,000. The molecular weight distribution Mw/Mn is preferably 1.00 to 2.00. In the case where a plurality of kinds of blocks derived from hydrophilic polymers (A2) are present in the oil-soluble low block copolymer (A), the hydrophilic polymer (A2) defined above indicates a block copolymer in which such blocks are linked together to form a hydrophilic segment.

—HLB Value

The HLB value indicates the degree of oil solubility of the oil-soluble low block copolymer (A) which has such a hydrophobic segment as the block derived from an aliphatic polyester resin (A1), and such a hydrophilic segment as the block derived from a hydrophilic polymer (A2). In the present invention, the HLB value is defined according to the Griffin's method expressed by the following equation. As seen from the equation below, the degree of oil solubility (hydrophobicity) becomes higher as the HLB value approximates to 0, and the degree of water solubility (hydrophilicity) is increased as the HLB value approximates to 20.

$$HLB = 20 \times (Mn \text{ of hydrophilic polymer})/(Mn \text{ of low block copolymer})$$

The HLB value (oil solubility) of the oil-soluble low block copolymer (A) in the invention may be controlled appropriately as long as the copolymer can be dissolved in an organic solvent that forms the oil phase in the inventive nanofiber production method to form nanofibers of the invention. The HLB value is usually not less than 0.4 and not more than 10, and preferably not less than 0.4 and not more than 3.

—Preparation Method

The oil-soluble low block copolymer (A) which includes a block derived from an aliphatic polyester resin (A1) and a block derived from a hydrophilic polymer (A2) may be synthesized according to a known method. Typically, the oil-soluble low block copolymer (A) may be synthesized by first preparing a hydrophilic polymer (A2) terminated with a functional group (for example, a hydroxyl group) for the introduction of a block of an aliphatic polyester resin (A1), and thereafter performing a polymerization reaction to form an aliphatic polyester resin (A1) starting from the functional group. The synthesis conditions may be controlled appropriately so that the obtainable oil-soluble low block copolymer (A) will have appropriate, preferably the above-mentioned specific ranges of number average molecular weight Mn, weight average molecular weight Mw, molecular weight distribution Mw/Mn and HLB value.

For example, the HLB value may be controlled by controlling the ratio of the length of the molecular chain of the aliphatic polyester resin (A1) block, which is a hydrophobic segment, to the length of the molecular chain of the hydrophilic polymer (A2) block, which is a hydrophilic segment, in the oil-soluble low block copolymer (A). In general, the HLB value of the oil-soluble low block copolymer (A) is lowered by decreasing the length of the molecular chain of the hydrophilic polymer (A2) block, namely, by reducing the ratio of the Mn of the hydrophilic polymer (A2) relative to the Mn of the aliphatic polyester resin (A1) in the synthesis of the oil-soluble low block copolymer (A). In more detail, for example, an oil-soluble low block copolymer (A) having an HLB value of not less than 0.4 and not more than 10 may be prepared by performing the polymerization such that the polymerization degree of the block derived from a hydrophilic polymer (A2)

is in the range of 0.1 to 100 parts based on 100 parts of the polymerization degree of the block derived from an aliphatic polyester resin (A1).

—Aliphatic Polyester Resin (A0)—

In the present invention (in particular, in the nanofiber production method of the invention), an aliphatic polyester resin (A0) may be used as a material for nanofiber production in place of the oil-soluble low block copolymer (A) including a block derived from an aliphatic polyester resin (A1) and a block derived from a hydrophilic polymer (A2). The aliphatic polyester resin (A0) may an aliphatic polyester resin similar to the aliphatic polyester resin (A1), for example, a resin in which a hydroxycarboxylic acid or a dicarboxylic acid that is a component of the resin has 2 to 6 carbon atoms, or may be any of other known aliphatic polyester resins as long as the resin can be dissolved in an organic solvent used in the inventive nanofiber production method to form an oil phase. Further, the aliphatic polyester resin (A0) may be a polymer synthesized from one, or two or more kinds of monomers. That is, the aliphatic polyester resin (A0) may be a homopolymer, a random polymer, or a block copolymer in a narrow or broad sense in which homopolymers, random copolymers, or a homopolymer and a random copolymer are linked with each other.

Suitable examples of the aliphatic polyester resins (A0) include similar compounds to the aliphatic polyester resins (A1) used in the synthesis of the oil-soluble low block copolymer (A) such as polylactic acid, polyglycolic acid, polycaproic acid and polybutylene succinate (namely, these aliphatic polyester resins are used as such instead of being used for the synthesis of the low block copolymer). These resins may be used singly, or two or more kinds may be used in combination.

Similarly to the aliphatic polyester resin (A1) used in the synthesis of the oil-soluble low block copolymer (A), the aliphatic polyester resin (A0) preferably has a number average molecular weight Mn of 100 to 200,000, a weight average molecular weight Mw of 100 to 200,000, and a molecular weight distribution Mw/Mn of 1.00 to 2.00 according to GPC.

—Water-Soluble Low Block Copolymer (B)—

The nanofiber production method of the invention preferably involves a water-soluble low block copolymer (B) as a surfactant (an emulsifier) added to the aqueous phase. This copolymer includes a block derived from an aliphatic polyester resin (B1) and a block derived from a hydrophilic polymer (B2). The block derived from an aliphatic polyester resin (B1) forms a hydrophobic segment, and the block derived from a hydrophilic polymer (B2) literally forms a hydrophilic segment. The water-soluble low block copolymer (B) in which these blocks are linked together exhibits water solubility as a whole and is soluble in water (or an aqueous solvent). In the nanofiber production method of the invention, the water-soluble low block copolymer (B) is dissolved as a surfactant (SF) in an aqueous solution (W), and functions to lower the surface tension when the organic solvent solution (S) of the oil-soluble low block copolymer (A) is extruded into the aqueous solution (W).

The water-soluble low block copolymer (B) preferably has a number average molecular weight Mn of 500 to 200,000, a weight average molecular weight Mw of 500 to 200,000, and a molecular weight distribution Mw/Mn of 1.00 to 2.00 according to GPC.

The water-soluble low block copolymer (B) used as a surfactant (SF) may be a single low block copolymer described above, or a mixture of two or more kinds of low block copolymers described above.

—Aliphatic Polyester Resin (B1) Block

The aliphatic polyester resin (B1) that forms a portion of the blocks in the water-soluble low block copolymer (B) may be similar to the aliphatic polyester resin (A1) used for the preparation of the oil-soluble low block copolymer (A) or to the aliphatic polyester resin (A0). Thus, repeated explanations are avoided except some major points. Suitable examples of the aliphatic polyester resins (B1) include general biodegradable resins such as polylactic acid, polyglycolic acid, polycaproic acid and polybutylene succinate. The aliphatic polyester resin (B1) preferably has a number average molecular weight Mn of 100 to 200,000, a weight average molecular weight Mw of 100 to 200,000, and a molecular weight distribution Mw/Mn of 1.00 to 2.00 according to GPC.

The aliphatic polyester resin (B1) for preparing the water-soluble low block copolymer (B) as a surfactant (SF) may not be necessarily the same as and may be different from the aliphatic polyester resin (A0) or the aliphatic polyester resin (A1) used to prepare the oil-soluble low block copolymer (A) forming the nanofibers.

—Hydrophilic Polymer (B2) Block

The hydrophilic polymer (B2) that forms a portion of the blocks in the water-soluble low block copolymer (B) may be similar to the water-soluble polymer (A2) used for the preparation of the oil-soluble low block copolymer (A). Thus, repeated explanations are avoided except some major points. Suitable examples of the hydrophilic polymers (B2) include polyoxyethylene, polyoxypropylene, polyvinyl alcohol, partially hydrolyzed polyvinyl acetate copolymer, polymethacrylic acid, polyacrylic acid, polyacrylamide, polyaspartic acid, polysaccharides, polyisopropylacrylamide, poly (sodium styrenesulfonate) and derivatives of these polymers. The hydrophilic polymer (B2) preferably has a number average molecular weight Mn of 100 to 200,000, a weight average molecular weight Mw of 100 to 200,000, and a molecular weight distribution Mw/Mn of 1.00 to 2.00 according to GPC.

The water-soluble polymer (B2) for preparing the water-soluble low block copolymer (B) as a surfactant may not be necessarily the same as and may be different from the water-soluble polymer (A2) used to prepare the oil-soluble low block copolymer (A) forming the nanofibers.

—HLB Value

Similarly to the representation of the degree of oil solubility of the oil-soluble low block copolymer (A), the HLB value, in particular the HLB value according to the Griffin's method indicates the degree of water solubility of the water-soluble low block copolymer (B) which has such a hydrophobic segment as the block derived from an aliphatic polyester resin (B1), and such a hydrophilic segment as the block derived from a hydrophilic polymer (B2).

The HLB value (water solubility) of the water-soluble low block copolymer (B) in the invention may be controlled appropriately as long as the copolymer can be dissolved in water that forms the aqueous phase in the inventive nanofiber production method and exhibits the desired function as a surfactant. The HLB value is usually not less than 8 and less than 20, and preferably not less than 15 and less than 20.

—Preparation Method

The water-soluble low block copolymer (B) which includes a block derived from an aliphatic polyester resin (B1) and a block derived from a hydrophilic polymer (B2) may be synthesized according to a known method. The preparation method may be similar to the method for the production of the oil-soluble low block copolymer (A). Thus, repeated explanations are avoided except some major points. In general, the HLB value of the water-soluble low block copolymer (B) is increased by increasing the length of the molecular chain of the hydrophilic polymer (B2) block, for example, by increasing the ratio of the Mn of the hydrophilic polymer (B2) relative to the Mn of the aliphatic polyester resin (B1) in the synthesis of the water-soluble low block copolymer (B). In more detail, for example, a water-soluble low block copolymer (B) having an HLB value of not less than 8 and less than 20 may be prepared by performing the polymerization such that the polymerization degree of the block derived from a hydrophilic polymer (B2) is in the range of 100 to 100,000 parts based on 100 parts of the polymerization degree of the block derived from an aliphatic polyester resin (B1).

—Nanofibers—

Nanofibers according to the invention (in particular, nanofibers obtained by the inventive nanofiber production method) include the oil-soluble low block copolymer (A) including a block derived from an aliphatic polyester resin (A1) and a block derived from a hydrophilic polymer (A2). The average cross sectional diameter of the fibers is a nanometer size.

—Cross Sectional Diameter

The cross sectional diameters (fiber widths) of the nanofibers of the invention are not particularly limited and may be controlled appropriately in accordance with applications as long as the diameters are nanometer sizes, namely, most of the fibers are less than 1 μm in cross sectional diameter. According to the invention, in particular, nanofibers can be produced by the inventive production method, which will be described later, involving a double-tube micronozzle channel in a particular embodiment. Thus, the average cross sectional diameter of nanofibers may be usually controlled in the range of 50 to 1000 nm, and preferably 100 to 500 nm. In order to produce nanofibers satisfying such conditions in terms of average cross sectional diameter, it is particularly preferable to use a double-tube micronozzle channel as will be described later. For example, the average cross sectional diameter of nanofibers may be controlled in the above range by controlling the flow rates and the flow rate ratio of the inner and outer phases.

As used herein, the term "average cross sectional diameter" refers to a number average value of cross sectional diameters. For example, the average cross sectional diameter may be calculated by observing a specific number (for example, 50) of nanofibers using a scanning electron microscope (SEM).

—Nanofiber Production Method—

The method for producing nanofibers of the invention includes a step (1): extrusion step, and a step (2): spinning step described later. The method may further include a step (3): winding step, and other steps as required. The steps (1) to (3) are usually carried out continuously and simultaneously. In the following description, an oil-soluble low block copolymer (A) and a water-soluble low block copolymer (B) are similar to those described hereinabove.

—Apparatus

The operations such as extrusion and drawing in the nanofiber production method of the invention may be performed using an apparatus conventionally used in a wet double spinning method such as a double wet spinning apparatus described in Patent Literature 1 which is used for the production of hollow filaments having a non-nanometer fiber width, optionally with modifications so that the apparatus will become better adapted to the nanofiber production method of the invention.

In particular, the nanofiber production method of the invention desirably involves a "double-tube micronozzle apparatus" equipped with a double-tube micronozzle channel through which an organic solvent solution (S) and an aqueous solution (W) are supplied (see FIG. 1). To this apparatus, two syringes (or similar means) containing an organic solvent solution (S) and an aqueous solution (W), respectively, are connected via channels. The apparatus is configured such that the organic solvent solution (S) and the aqueous solution (W) are extruded from an inner tube and an outer tube, respectively, of the double-tube nozzle at respective predetermined rates. The diameters of the inner tube and the outer tube may be determined appropriately in accordance with, for example, the fiber width of the nanofibers to be produced and properties of the organic solvent solution (S). The inner tube diameter is usually 50 to 300 μm, and the outer tube diameter is usually 200 to 2000 μm.

—Inner Phase and Outer Phase

In the production method of the invention, an oil phase is defined by an organic solvent solution (S) of the oil-soluble low block copolymer (A), and an aqueous phase is defined by an aqueous solution (W) of a surfactant. In the double-tube micronozzle apparatus described below, the organic solvent solution (S) is passed through an inner circular tube (an inner phase), and the aqueous solution (W) is passed through an outer circular tube (an outer phase).

The surfactant (SF) dissolved in the aqueous solution (W) is an additive which helps an organic solvent (S1) in the organic solvent solution (S) be diffused or extracted into the aqueous solution (W). In the invention, the surfactant (SF) may be selected from known various surfactants having such a function. Preferred surfactants are nonionic surfactants, in particular the water-soluble low block copolymer (B) or any surfactants having a chemical structure similar thereto (having a polyalkylene oxide chain).

The organic solvent for forming the organic solvent solution (S) of the oil-soluble low block copolymer (A) or the aliphatic polyester resin (A0) may be selected from appropriate solvents such as esters (such as ethyl acetate), ethers, ketones, aromatic compounds (such as benzene and xylene), alcohols, halogenated hydrocarbons and carbonates. These organic solvents may be used singly, or two or more kinds may be used in combination as a mixed organic solvent. A preferred organic solvent is one which exhibits good solvent properties for the oil-soluble low block copolymer (A) or the aliphatic polyester resin (A0) and is favorably diffused or extracted upon being extruded into the aqueous phase by the action of the surfactant (SF), in particular the water-soluble low block copolymer (B) present in the aqueous solution (W).

On the other hand, water is basically the only solvent for forming the aqueous solution (W) of the surfactant, in particular the water-soluble low block copolymer (B). Another solvent which exhibits high compatibility with water may be used in combination as required.

The organic solvent solution (S) and the aqueous solution (W) may be appropriately prepared prior to use in the inventive production method, by mixing the predetermined solvents and components according to a common method. Further, the oil-soluble low block copolymer (A) and the water-soluble low block copolymer (B) may be appropriately synthesized beforehand by the methods described hereinabove.

The concentration of the oil-soluble low block copolymer (A) or the aliphatic polyester resin (A0) in the organic solvent solution (S) may be controlled in consideration of, for example, the solubility in the organic solvent (S1), target properties of nanofibers, and spinnability in the inventive production method. The concentration may be usually controlled in the range of 5 to 30 wt %, and preferably 7 to 20 wt %.

On the other hand, the concentration of the surfactant (SF), in particular the water-soluble low block copolymer (B) in the aqueous solution (W) may be controlled while ensuring that the surfactant will achieve the desired function described above. The concentration may be usually controlled in the range of 0.1 to 10 wt %, and preferably 1 to 5 wt %.

It is preferable that the ratio ($\eta_r = \eta_s/\eta_w$) be controlled to be in an appropriate range, for example 50 or more, wherein $\eta_s$ is the viscosity of the organic solvent solution (S) defining the inner phase and $\eta_w$ is the viscosity of the aqueous solution (W) as the outer phase. Because it is difficult to reduce the viscosity of the aqueous solution (W) to below water viscosity, the above ratio ($\eta_r$) is usually controlled by controlling the viscosity of the organic solvent solution (S). The upper limit of the ratio ($\eta_r$) may be determined in consideration of, for example, spinnability. For example, the upper limit may be 50,000.

<Step (1): Extrusion Step>

In the step (1): extrusion step of the inventive production method, an organic solvent solution (S) is extruded into filaments in an aqueous solution (W) including a surfactant (SF) and water (S2). The organic solvent solution (S) includes an aliphatic polyester resin (A0) or an oil-soluble low block copolymer (A) including a block derived from an aliphatic polyester resin (A1) in which a hydroxycarboxylic acid or a dicarboxylic acid that is a component of the resin has 2 to 6 carbon atoms, and a block derived from a hydrophilic polymer (A2), and an organic solvent (S1).

The cross sectional diameter of the obtainable nanofibers may be controlled by controlling the extrusion rates (flow rates) of the organic solvent solution (S) and the aqueous solution (W) as well as the ratio of the flow rates (flow rate ratio) in the extrusion step. Usually, the flow rate of the aqueous solution (W) is set at a higher rate than the flow rate of the organic solvent solution (S). Generally, increasing the ratio of the flow rate of the former to the flow rate of the latter (extruding the aqueous solution (W) at a relatively higher rate) tends to lead to an increase in the rate of diffusion or extraction of the organic solvent (S1) in the next spinning step as well as to a finer cross sectional diameter of the obtainable nanofibers. The extrusion rates (flow rates) of the organic solvent solution (S) and the aqueous solution (W) as well as the ratio of the flow rates (flow rate ratio) are not particularly limited and may be controlled appropriately in accordance with the type of apparatus used in this step. In the case where a double-tube micronozzle apparatus such as one described later is used, the flow rates are controlled such that the flow rate of the organic solvent solution (S) as the inner phase is usually 1 to 50 µL/min, preferably 1 to 10 µL/min; the flow rate of the aqueous solution (W) as the outer phase is usually 1000 to 20000 µL/min, preferably 4000 to 10000 µL/min; and the ratio of the latter to the former is usually 100 to 20000, preferably 1000 to 2000.

<Step (2): Spinning Step>

In the step (2): spinning step of the inventive production method, the filaments of the organic solvent solution (S) extruded in the step (1) are collected while the organic solvent (S1) of the organic solvent solution (S) is simultaneously diffused or extracted into the aqueous solution (W), thereby forming fibers including the aliphatic polyester resin (A0) or the oil-soluble low block copolymer (A). The term "diffused" indicates that the organic solvent (S1) moves from the organic solvent solution (S) as the inner phase to the aqueous solution (W) as the outer phase usually until a saturation solubility of the organic solvent (S1) with respect to the aqueous solution (W) is reached. The term "extracted" means that the saturation solubility of the organic solvent (S1) with respect to the aqueous solution (W) is increased mainly by the action of the surfactant, in particular the water-soluble low block copolymer (B) to allow an increased amount of the organic solvent (S1) to move into the aqueous solution (W). Although the diffusive effect is probably predominant in the present invention, both diffusive and extractive effects may occur at the same time. The surfactant (SF) can contribute to both of these effects.

As the organic solvent (S1) of the organic solvent solution (S) is diffused or extracted into the aqueous solution (W), the aliphatic polyester resin (A0) or the oil-soluble low block copolymer (A) that has been dissolved in the organic solvent solution (S) is precipitated into a solid resin, thus forming resin fibers. This fiber formation may be performed continuously by collecting the organic solvent solution (S) that has been extruded into filaments in the step (1), or fibers formed at an initial stage. The collection in this step (which may be performed practically by "winding" in the next step (3)) may be carried out using an appropriate technique and apparatus or device therefor in accordance with procedures used in a known wet spinning method.

<Step (3): Winding Step>

In the optional step (3): winding step of the inventive production method, the fibers formed in the step (2) is wound without or while drawing the fibers. This winding step may be added when winding of the nanofibers is advantageous in view of applications.

According to the inventive production method, nanofibers having a nanosized fiber width may be produced even without drawing the fibers. Thus, it is not necessary that the fibers be wound while being drawn in this step. However, the fibers may be would while being drawn where desired. Drawing of the fibers may be carried out by winding the fibers at a higher rate than the extrusion rate (flow rate) of the aqueous solution (W) in the step (1). The winding in this step may be carried out using an appropriate technique and apparatus or device therefor in accordance with procedures used in a known wet spinning method.

—Applications of Nanofibers—

The nanofibers of the invention find use in various applications taking advantage of the facts that they are formed of a biodegradable resin (an aliphatic polyester resin) and have a nanometer fiber width. Examples of the applications of the nanofibers include regenerative medicine, cell culture supports, biological implant materials, DDS, suture threads, artificial blood vessels, filtration, filters, fibers, coating materials, garments, fiber reinforced plastics, cell materials and cell separators. The nanofibers of the invention are typically formed of a polylactic acid resin having PEG chains on its surface, and exhibit excellent biocompatibility. Thus, the nanofibers may be suitably used as medical materials such as scaffolds for cell culture and growth (cell culture supports).

EXAMPLES

[1] Synthesis of Oil-Soluble Diblock Copolymer (A)

A diblock copolymer (PEG-PLA) was synthesized by ring-opening polymerization of D,L-lactide using MeO-PEG (Mw=4,600, Mw/Mn=1.06) as an initiator. The polymerization scale was such that the MeO-PEG concentration was 15 mol % and the feed amount was 10 g. The polymerization was catalyzed by 50 µL of a tin (II) 2-ethylhexanoate/toluene (concentration 0.4 g/5 mL) solution. The polymerization was performed in an oil bath at 130° C. for 24 hours. The resultant product was dissolved in chloroform and was reprecipitated in hexane, thereby removing the catalyst from the product. The product was reprecipitated in 2-propanol to remove unreacted monomers therefrom. Thereafter, the product was recovered by centrifugation (15,000 rpm, 5 min). The recovered product was dried overnight under reduced pressure. Thus, an oil-soluble diblock copolymer (Mw=100,000 (PEG 4,600+PLA 95,400), Mw/Mn=1.60, HLB=0.92) was obtained. The yield was 68.9 wt %.

[2] Synthesis of Water-Soluble Diblock Copolymer (B)

A diblock copolymer (PEG-PLA) was synthesized by ring-opening polymerization of D,L-lactide using MeO-PEG (Mw=4,600, Mw/Mn=1.06) as an initiator. The polymerization scale was such that the MeO-PEG concentration was 15 mol % and the feed amount was 10 g. The polymerization was catalyzed by 50 µL of a tin (II) 2-ethylhexanoate/toluene (concentration 0.4 g/5 mL) solution. The polymerization was performed in an oil bath at 130° C. for 24 hours. The resultant product was dissolved in chloroform and was reprecipitated in hexane, thereby removing the catalyst from the product. The product was reprecipitated in 2-propanol to remove unreacted monomers therefrom. Thereafter, the product was recovered by centrifugation (15,000 rpm, 5 min). The recovered product was dried overnight under reduced pressure. Thus, a water-soluble diblock copolymer (Mw=5,700 (PEG 4,600+PLA 1,100), Mw/Mn=1.05, HLB=18.2) was obtained. The yield was 73.3 wt %.

[3] Production of Nanofibers

1) The oil-soluble diblock copolymer, 0.2 g, synthesized in [1] was weighed in a sample bottle.

2) Oil Blue N weighing 0.03 g was added to the sample bottle, and ethyl acetate was added to a total weight of 2 g. (The concentration of the oil-soluble diblock copolymer was 10 wt %.)

3) To the solution, 1 g of acetone was added. The mixture was stirred with a stirrer, thereby preparing an organic solvent solution (S) as an inner phase. The viscosity of the organic solvent solution (S) was 140 mPa·s.

4) The water-soluble diblock copolymer, 1.0 g, synthesized in [2] was weighed into a sample bottle, and ultrapure water was added to a total weight of 50 g. (The concentration of the water-soluble diblock copolymer was 2 wt %.) The resultant solution was used as an aqueous solution (W) forming an outer phase. The viscosity of the aqueous solution (W) was 1.6 mPa·s.

Figure 2:
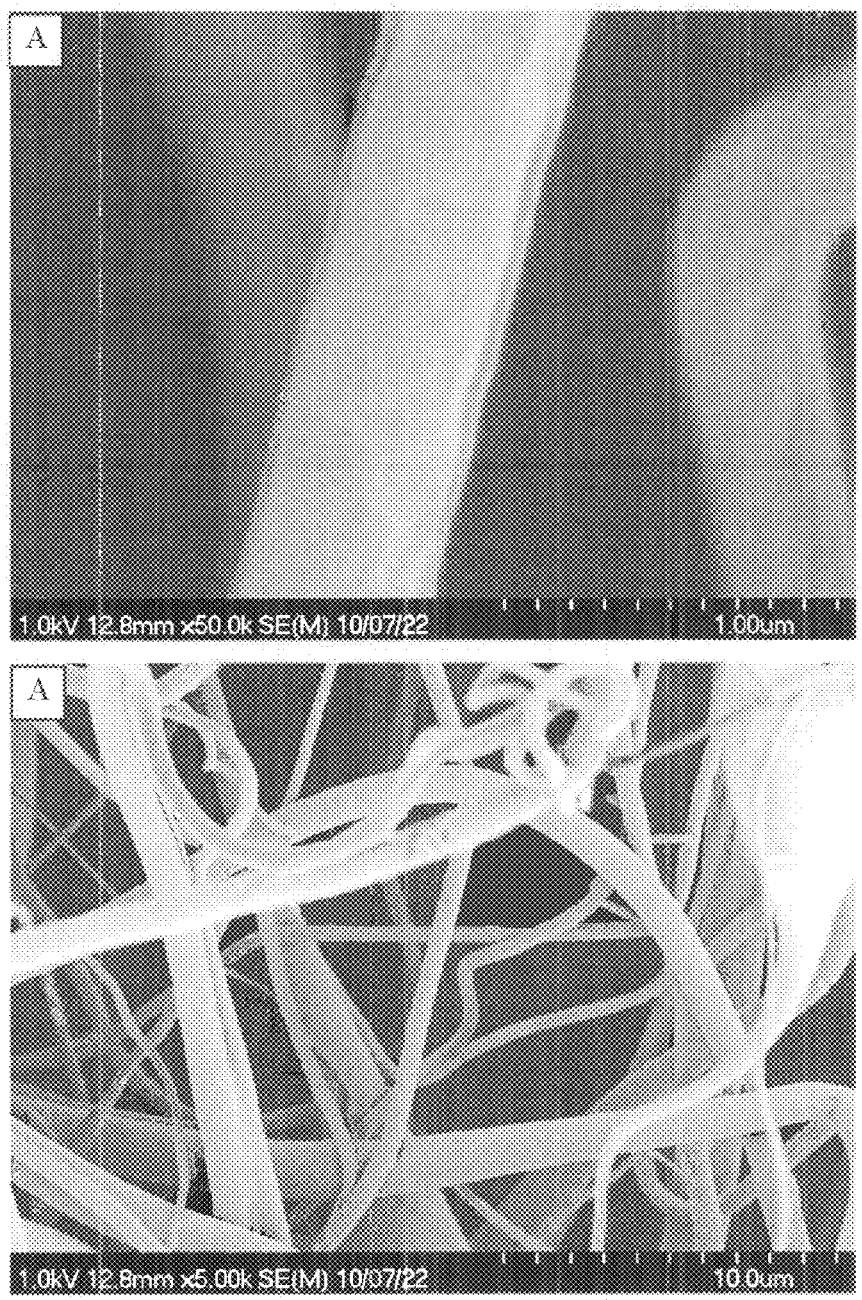
FIG. 2 is a set of SEM images of nanofibers (A: outer phase flow rate 4,000 μL/min, inner phase flow rate 5 μL/min) produced in the Examples.
Figure 3:
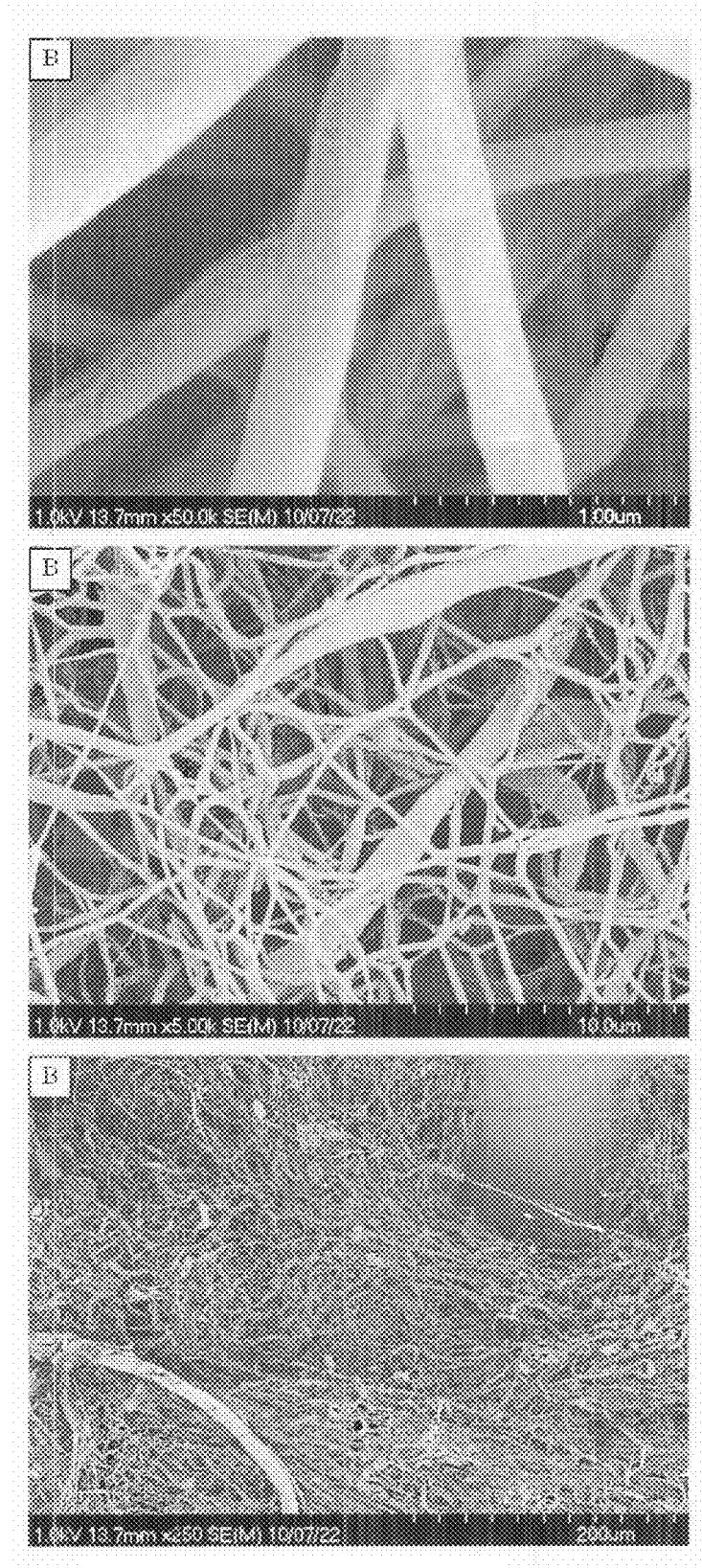
FIG. 3 is a set of SEM images of nanofibers (B: outer phase flow rate 7,000 μL/min, inner phase flow rate 5 μL/min) produced in the Examples.
Figure 4:
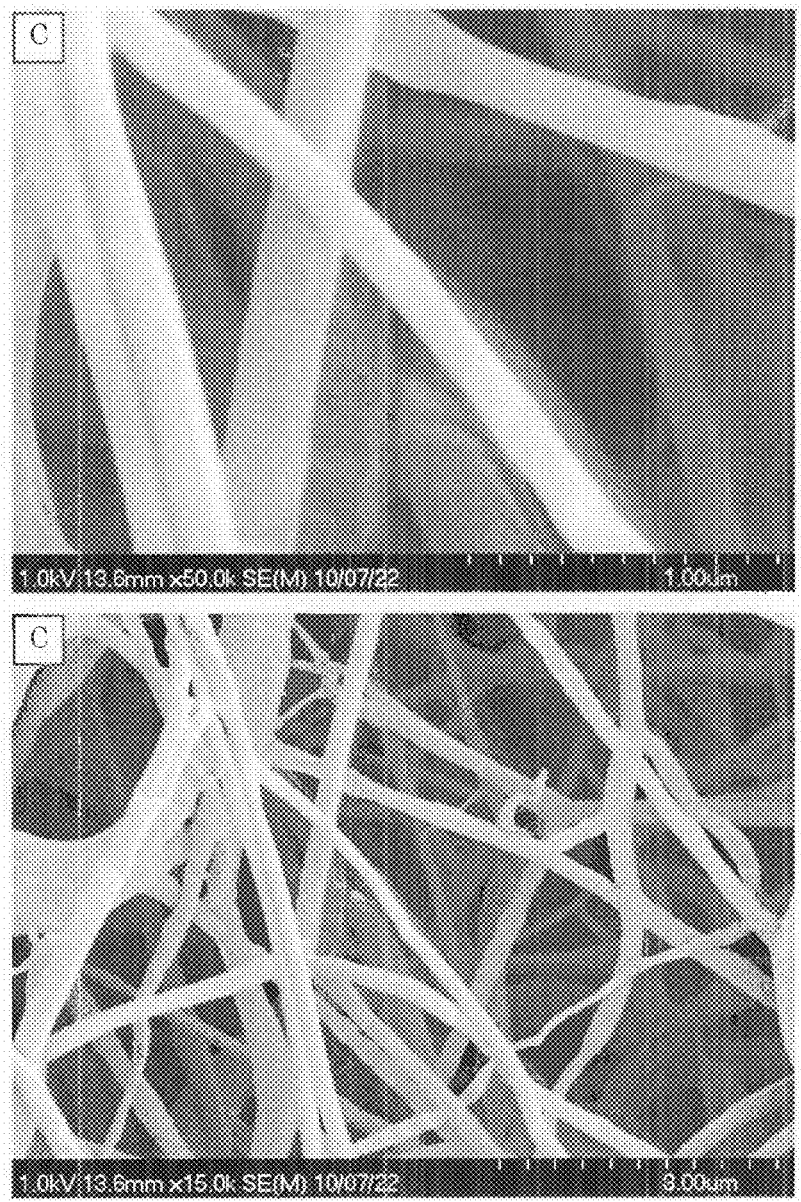
FIG. 4 is a set of SEM images of nanofibers (C: outer phase flow rate 10,000 μL/min, inner phase flow rate 5 μL/min) produced in the Examples.

5) A double-tube micronozzle apparatus was provided (see FIG. 1, 130 µm in width of a microchannel for the inner phase (inner tube diameter) and 200 µm in width of a microchannel for the outer phase (outer tube diameter)). The organic solvent phase (S) as the outer phase and the aqueous solution (W) as the inner phase were fed via respective syringe pumps. The resultant jet and fibers were observed. The flow rates of the outer phase and the inner phase were changed according to three combinations A to C described below. FIGS. 2 to 4 depict SEM images of nanofibers obtained with respective combinations. The diameters of the obtained fibers were about 200 to 500 nm.

A: outer phase flow rate: 4,000 µL/min, inner phase flow rate: 5 µL/min

B: outer phase flow rate: 7,000 µL/min, inner phase flow rate: 5 µL/min

C: outer phase flow rate: 10,000 µL/min, inner phase flow rate: 5 µL/min

REFERENCE SIGNS LIST

1: DOUBLE-TUBE MICRONOZZLE APPARATUS
2: SYRINGES
10: AQUEOUS SOLUTION (W)
20: ORGANIC SOLVENT SOLUTION (S)
21: ORGANIC SOLVENT (S1)
22: OIL-SOLUBLE LOW BLOCK COPOLYMER (A)
30: NANOFIBERS
100: DOUBLE-TUBE MICRONOZZLE
110: OUTER TUBE
120: INNER TUBE

The invention claimed is:

1. A method for producing nanofibers, the method comprising:
   (1) extruding an organic solvent solution (S) into filaments in an aqueous solution (W) comprising a surfactant (SF) and water, wherein the organic solvent solution (S) comprises an aliphatic polyester resin (A0) or an oil-soluble low block copolymer (A) comprising a block derived from an aliphatic polyester resin (A1) and a block derived from a hydrophilic polymer (A2), and an organic solvent (S1); and
   (2) collecting filaments of the organic solvent solution (S) extruded in (1) while simultaneously diffusing or extracting the organic solvent (S1) of the organic solvent solution (S) into the aqueous solution (W), thereby forming fibers comprising the aliphatic polyester resin (A0) or the oil-soluble low block copolymer (A).

2. The method according to claim 1, wherein in the extrusion (1), the organic solvent solution (S) and the aqueous solution (W) are supplied through a double-tube micronozzle channel.

3. The method according to claim 1, wherein the oil-soluble low block copolymer (A) is an oil-soluble di- or triblock copolymer (A) comprising one or two blocks derived from at least one aliphatic polyester resin (A1), and one or two blocks derived from at least one hydrophilic polymer (A2).

4. The method according to claim 1, wherein the aliphatic polyester resin (A0) or the aliphatic polyester resin (A1) is at least one selected from the group consisting of polylactic acid, polyglycolic acid, polycaproic acid and polybutylene succinate.

5. The method according to claim 1, wherein the hydrophilic polymer (A2) is at least one selected from the group consisting of polyoxyethylene, polyoxypropylene, polyvinyl alcohol, partially hydrolyzed polyvinyl acetate copolymer, polymethacrylic acid, polyacrylic acid, polyacrylamide, polyaspartic acid, polysaccharides, polyisopropylacrylamide, poly(sodium styrenesulfonate) and derivatives of these polymers.

6. The method according to claim 1, wherein the oil-soluble low block copolymer (A) has an HLB value of not less than 0.4 and not more than 10.

7. The method according to claim 1, wherein the surfactant (SF) is a nonionic surfactant.

8. The method according to claim 1, wherein the surfactant (SF) is a water-soluble low block copolymer (B) comprising a block derived from an aliphatic polyester resin (B1) and a block derived from a hydrophilic polymer (B2).

9. The method according to claim 8, wherein the water-soluble low block copolymer (B) is a water-soluble di- or triblock copolymer (B) which includes one or two blocks derived from at least one aliphatic polyester resin (B1), and one or two blocks derived from at least one hydrophilic polymer.

10. The method according to claim 8, wherein the aliphatic polyester resin (B1) is at least one selected from the group consisting of polylactic acid, polyglycolic acid, polycaproic acid and polybutylene succinate.

11. The method according to claim 8, wherein the hydrophilic polymer (B2) is at least one selected from the group consisting of polyoxyethylene, polyoxypropylene, polyvinyl alcohol, partially hydrolyzed polyvinyl acetate copolymer, polymethacrylic acid, polyacrylic acid, polyacrylamide, polyaspartic acid, polysaccharides, polyisopropylacrylamide, poly(sodium styrenesulfonate) and derivatives of these polymers.

12. The method according to claim 8, wherein the water-soluble low block copolymer (B) has an HLB value of not less than 8 and less than 20.

13. The method according to claim 1, wherein the organic solvent (S1) is at least one organic solvent capable of dissolving the oil-soluble low block copolymer (A) selected from the group consisting of an ester, an ether, a ketone, an aromatic alcohol, a halogenated hydrocarbon and a carbonate.

14. The method according to claim 1, wherein a ratio ($\eta_r = \eta_s/\eta_w$) is 50 to 50,000, wherein $\eta_s$ is the viscosity of the organic solvent solution (S) and $\eta_w$ is the viscosity of the aqueous solution (W) that is an outer phase.

15. The method according to claim 1, further comprising:
    (3) winding fibers formed in the collecting (2) without or while drawing the fibers.

16. Nanofibers obtained by the method of claim 1, comprising the oil-soluble low block copolymer (A),
    wherein an average cross sectional diameter of the nanofibers is less than 1 μm.

17. The nanofibers according to claim 16,
    wherein the average cross sectional diameter is in the range of 100 to 500.

18. The nanofibers according to claim 16,
    wherein the oil-soluble low block copolymer (A) is an oil-soluble di- or triblock copolymer (A) comprising one or two blocks derived from at least one aliphatic polyester resin (A1), and one or two blocks derived from at least one hydrophilic polymer (A2).

19. The nanofibers according to claim 16,
    wherein the aliphatic polyester resin (A1) is at least one selected from the group consisting of polylactic acid, polyglycolic acid, polycaproic acid and polybutylene succinate.

20. The nanofibers according to claim 16,
    wherein the hydrophilic polymer (A2) is at least one selected from the group consisting of polyoxyethylene, polyoxypropylene, polyvinyl alcohol, partially hydrolyzed polyvinyl acetate copolymer, polymethacrylic acid, polyacrylic acid, polyacrylamide, polyaspartic acid, polysaccharides, polyisopropylacrylamide, poly(sodium styrenesulfonate) and derivatives of these polymers.

21. The nanofibers according to claim 16,
    wherein the oil-soluble low block copolymer (A) has an HLB value of not less than 0.4 and not more than 10.

22. A scaffold for cell culture and growth, the scaffold comprising the nanofibers according to claim 16.

* * * * *